United States Patent [19]

Stockburger et al.

[11] Patent Number: 4,542,465

[45] Date of Patent: Sep. 17, 1985

[54] METHOD OF PRODUCING A CONTROLLED NUMBER OF AUTHORIZATION MEMBERS

[76] Inventors: Hermann Stockburger, Kirnachweg 7, D-7742 St. Georgen; Hans-Georg Winderlich, Niedere Strasse 36, D-7730 VS-Villingen, both of Fed. Rep. of Germany

[21] Appl. No.: 394,917

[22] PCT Filed: Oct. 30, 1981

[86] PCT No.: PCT/EP81/00173
§ 371 Date: Jun. 21, 1982
§ 102(e) Date: Jun. 21, 1982

[87] PCT Pub. No.: WO82/01610
PCT Pub. Date: May 13, 1982

[30] Foreign Application Priority Data

Nov. 3, 1980 [DE] Fed. Rep. of Germany ....... 3041393

[51] Int. Cl.⁴ .................. G11B 25/04; G06F 15/46
[52] U.S. Cl. .................. 364/468; 340/825.34; 360/17; 360/2; 235/382
[58] Field of Search .............. 101/DIG. 18; 346/133; 235/375, 382, 449, ; 360/2, 17, 15; 340/825.30, 825.31, 825.32, 825.33, 825.34, 825.35; 364/468, 478; 355/40

[56] References Cited

U.S. PATENT DOCUMENTS

| 3,751,639 | 8/1973 | Searle et al. | 340/825.3 |
| 3,783,755 | 1/1974 | Lagin | 355/40 |
| 3,996,450 | 12/1976 | Kerkhoff | 235/382.5 |
| 4,004,089 | 1/1977 | Richard et al. | 340/825.3 |
| 4,059,748 | 11/1977 | Violino | 360/2 |
| 4,106,062 | 8/1978 | Foote | 360/15 |
| 4,121,249 | 10/1978 | Lemelson | 360/2 |
| 4,139,875 | 2/1979 | Tatara | 360/2 |
| 4,209,850 | 6/1980 | Tazaki et al. | 360/15 |
| 4,231,072 | 10/1980 | Toyama | 360/2 |
| 4,288,825 | 9/1981 | Hasuo et al. | 360/2 |

Primary Examiner—Jerry Smith
Assistant Examiner—Louis Woo
Attorney, Agent, or Firm—Donald Brown

[57] ABSTRACT

A method of producing a controlled number of authorization members used for providing access to limited access machines or restricted areas, the method including generating a hierarchy of members having different levels of authorization prior to producing the authorization member.

7 Claims, 1 Drawing Figure

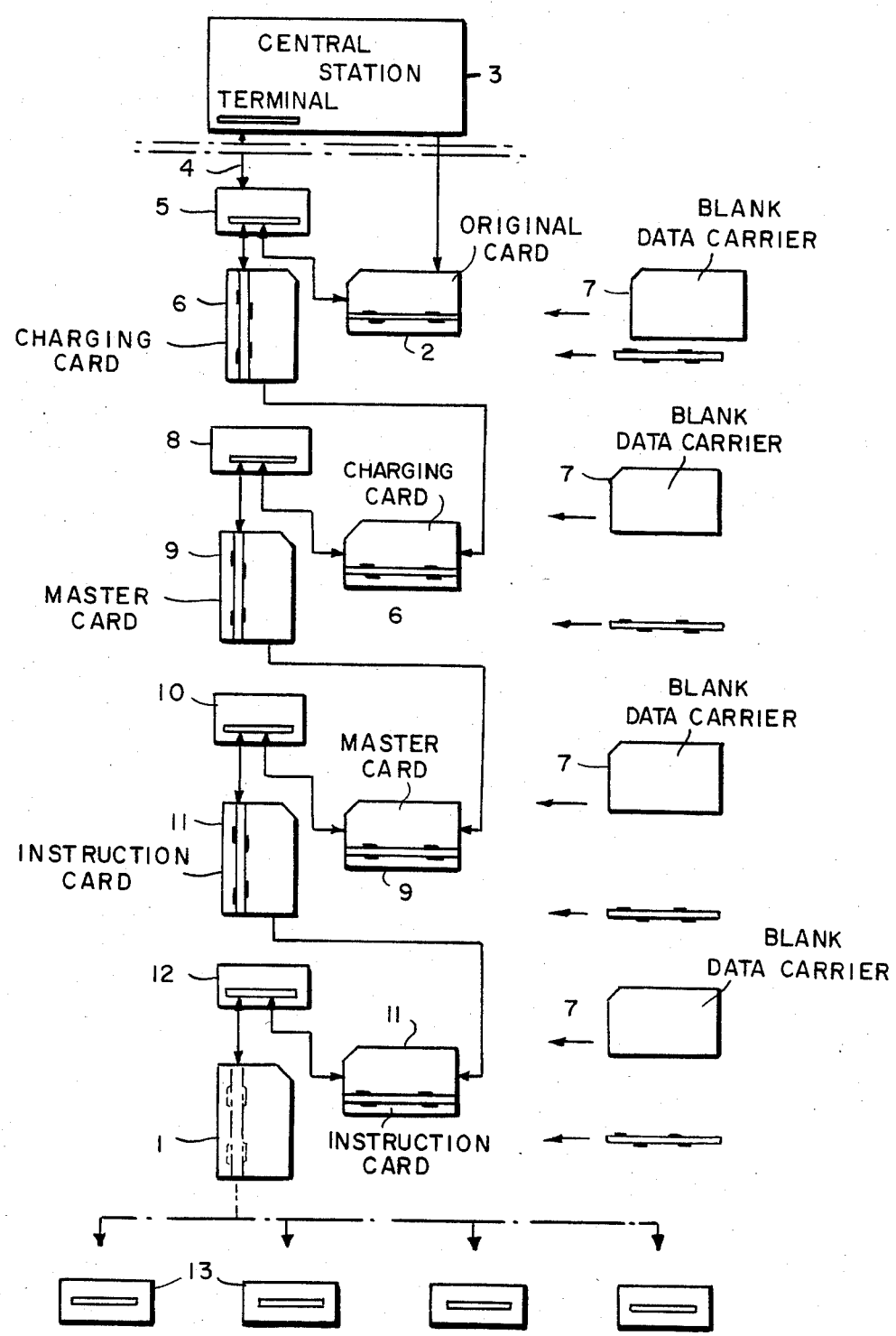

METHOD OF PRODUCING A CONTROLLED NUMBER OF AUTHORIZATION MEMBERS

This invention relates to a method or producing a controlled number of authorization members such as authorization cards, identity cards, check or value cards, etc., more particularly cards used for limited access to automatic service machines, automatic bank counters, administrations, restricted areas, etc.

A primary safety condition for any system allowing only authorized persons to perform specific operations by using an authorization card is that the production of the actual authorization cards should be possible only for authorized persons. Thus, the activation and the delivery of authorization cards should be restricted to a specific procedure to be defined in advance. Of course, security measures are necessary to avoid an unauthorized activation and delivery.

OBJECTS OF THE INVENTION

It is a primary object of the invention to provide a unique method of producing a controlled number of authorization members preventing an unauthorized activation and delivery of such authorization members, particularly of authorization cards.

It is a related object of the invention to provide a method of producing a controlled number of authorization members allowing the generation of a record with respect to any authorization members produced, particularly the number and scope thereof.

It is a still further object of the invention to provide a sequential method of producing authorization members by successive enabling of activating stations using an hierarchical system of unique authorization members each associated with a limited scope of authorization to produce a determined lot of authorization cards.

SUMMARY OF THE INVENTION

In accordance with the invention, authorization members are produced from blank data carriers such as cards of paper, paperboard, plastics, etc., having a storage medium such as a magnetic strip, and requiring no security measures prior to their activation in an activating station by storing coded data on the storage medium. To produce a limited number of authorization cards, a hierarchical system of unique production authorization cards is used each associated with a predetermined scope of authorization with respect to the number and type of authorization cards to be produced. In a preferred embodiment, the hierarchical system comprises an original card associated with the manager of the system and used to enable a first activating station; a charging card produced by activating a blank data carrier card in the first activating station; a master card produced from a blank data carrier card in a second activating station using the charging card to enable the second activating station; an instruction card produced from a blank data carrier card in a third activating station using the master card to enable the third activating system; and the actual authorization cards produced from blank data carrier cards by enabling a fourth activating station by introduction of the instruction card. While the charging card is associated with a predetermined total number of authorization cards allowed to be produced, the master card is associated with a predetermined fraction of the total number, i.e. a partial lot thereof, and the instruction card is associated with only a fraction of the partial lot, i.e. a sub-lot of the total number.

DESCRIPTION OF A PREFERRED EMBODIMENT

Further features and advantages of the invention stand out from the description of an exemplary embodiment with reference to the FIGURE. This FIGURE shows a schematic representation of the production of authorization cards.

The authorization members 1, termed authorization cards in the following description, are for example produced from blank data carrier cards 7 of paper, cardboard or plastics, provided with a magnetic strip. They bear no secret code and are worthless so that no security measures are necessary. The activation of these blank cards 7 comprises a sensing detection of the specific individual physical properties of a specific data carrier card that cannot be reproduced. From the detected properties, an authenticity protocol is made and introduced into a central processing unit (CPU). Therein, this authenticity protocol is combined with user or client specific information and/or other useful information to provide a checking information. The checking information is e.g. marked on the magnetic strip of the authorization card. The authorization card may additionally be provided with an authentication bracket by which the operator may adjust on his card personal identification (PIN) data only known to himself, in the form of a code word or code number. The adjustment is once marked in coded form on the magnetic strip. Upon subsequent use of the authorization card, the operator adjusts again his identification, and this is compared with the coded information. This will assure that the user is the authorized person.

In order to permit a predetermined total number of authorization cards 1 to be produced, the manager of the system is initially provided with a specific authorization card, i.e. an original card 2. This contains the card specific data, as well as the specific data relevant for the respective manager and the associated applications, to be defined by a central station 3 in agreement with the respective manager. In this manner, interference with other kinds of use is excluded. Using the original card 2, a manager specific program is called in a first activating station 5 connected to the central station 3 through a data line 4. By comparing the card structure and the adjustment made by the operator with the corresponding data stored on the original card, it will be assured that the operator is actually an authorized manager. The manager will now call a determined volume, e.g. in the form of an authorization to the production of a total number of authorization cards 1. This authorized volume is marked on a charging card 6 in a first activating station 5, in addition to activation and authentication of the card. The charging card 6 is made from a blank data carrier 7 in the manner disclosed above with respect to the authorization cards 1, and the blank data carrier 7 may again have an adjustment device for adjusting a personal code word, e.g. in the form of an authentication bracket. Using the charging card 6, a second activating station 8 may be enabled by introduction of data indicating the associated authorization and the number of the authorization cards to be produced. In the activating station 8, master cards 9 may be produced, activated and authenticated in the above disclosed manner, and additionally, data representative of the authorization to the production of a partial lot of the total number of authorization members as marked on the charging card 6, are marked on the master cards 9, together with the activation and authentication data.

Using the master card 9, the data indicating the authorization and the partial lot of the authorization members are introduced into a third activating station 10 to enable the same. Subsequently, instruction cards 11 may be produced in the activating station 10. Just as the original card, the charging card and the master card, this is provided with a magnetic strip and an authentication bracket. In the magnetic strip, the card specific data and the data resulting from the adjustment of a code word by the user are marked in coded form, together with data indicative of an authorization to the production of a sub-lot of the partial lot of the total number of authorization members 1.

A fourth, final activating station 12 is enabled by reading the data marked on an instruction card 11, i.e. data indicative of the authorization, and particularly of the authorization to produce a sub-lot of the partial lot of the total number of authorization cards 1. In the activating station 12, the final authorization cards 1 may now be produced from blank data carriers 7, and upon activation of each authorization card 1, coded data indicative of the physical card structure, the personal code word and the nature of authorization defined by the card are marked on the magnetic strip. Using an authorization card 1 of this kind, automatic service machines, money distributors, etc. may be activated within the defined scope of the authorization.

In operation of the method, when a master card 9 is produced, the number of the authorization cards 1 to be produced is initially read from the charging card 6, and subsequently a new number of authorization cards to be produced is marked, i.e. the previous authorized number reduced by the partial lot of the number of authorization members. In the same manner, upon the production of an instruction card 11, the data indicating the partial lot of authorization members are initially read from the master card 9, and subsequently, a new partial lot of the total number of authorization members is marked on the master card 9, i.e. the previous partial lot reduced by the sub-lot as marked on the instruction card 11. Finally, when an authorization card 1 is produced, the data indicative of the sub-lot of the partial lot of the total number of authorization members are read from the instruction card 11. Subsequently, after the production of each authorization card 1, the data with respect to the authorization to produce a sub-lot of the partial lot of the total number of authorization members minus 1 are marked on the instruction card, etc.

In all cases, the blank data carriers 7 used may have adjustment members, particularly authentication brackets, for adjustment of a personal code word, so that only the authorized person is permitted to operate a corresponding activating station. The above disclosed method allows only the manager of the system to activate charging cards, and to perform a sub-distribution of the corresponding authorization volumina among others, down to the actual client terminals 13. Any manipulation by unauthorized persons is excluded.

In the above exemplary embodiment, the original member, the charging member, the master member, the instruction member and the authorization member are data carrier cards, such as check cards, cards for operating automatic money delivery machines, etc. However, the method may be performed using other types of data carriers and is not restricted to the specific embodiment disclosed.

What is claimed is:

1. A method of producing a controlled number of authorization members from blank data carriers having a storage medium for storing data comprising the steps of supplying enabling data indicating an authorization to produce said authorization members to a first activating station, whereby said first activating station is enabled to produce a charging member from a blank data carrier, which member has stored thereon first data characterizing the specific data carrier and second data defining the scope of authorization to produce said number of authorization members, supplying said charging member to a second activating station, whereby said second activating station is enabled by said first and second data to produce a predetermined number of authorization members and said second data is reduced by a number corresponding to the predetermined number of authorization members produced by said second activating station.

2. The method of claim 1, wherein said authorization member is in the form of a card.

3. The method of claim 1, wherein said charging member is in the form of a card.

4. The method of claim 1, wherein said authorization members are provided with adjustment means for adjusting coded personal identity information associated with an authorized user thereon.

5. The method of claim 1, wherein said charging member is provided with adjustment means for adjusting coded personal identity information associated with an authorized user thereon.

6. A method of producing a controlled number of authorization members from blank data carriers having a storage medium for storing data comprising the steps of supplying enabling data indicating an authorization to produce said authorization members to a first activating station, whereby said first activating station is enabled to produce a charging member from a blank data carrier, which member has stored thereon first data characterizing the specific data carrier and second data defining the scope of authorization to produce said number of authorization members, supplying said charging member to a second activating station whereby said second activating station is enabled by said first and second data to produce a predetermined number of authorization members and said second data is reduced by a number corresponding to the predetermined number of authorization members produced by said second activating station, said enabling data is supplied to said first activating station using a data carrier on which the enabling data is stored in coded form, said data carrier being an original authorization member associated with a person authorized to produce said authorization members.

7. A method of producing a number of authorization members from blank data carriers comprising the steps of:
1. providing to a first activating station an original data carrier associated with an authorized user to permit said first station to provide a charging member,
2. providing said charging member to a second activating station to permit said second activating station to provide a master member,
3. providing said master member to a third activating station to permit said third activating station to provide an instruction member, each said instruction member produced containing data representing the number of authorization members which are permitted to be produced using said instruction member, and
4. providing said instruction member to a fourth activating station to permit said fourth activating station to provide authorization members, said fourth activating station reducing by 1 the number of authorization members which can be authorized by said instruction member each time an authorization member is produced by said fourth activating station.

* * * * *